US006024825A

United States Patent [19]

Dovel et al.

[11] Patent Number: 6,024,825

[45] Date of Patent: Feb. 15, 2000

[54] METHOD FOR FORMING AND ASSEMBLY OF FOLDED LEAFLETS

[75] Inventors: Keith R. Dovel, Kernersville; David W. Schlitts, Winston Salem; Carl W. Treleaven, Greensboro, all of N.C.

[73] Assignee: Pharmagraphics (Southeast), L.L.C., Greensboro, N.C.

[21] Appl. No.: 09/026,787

[22] Filed: Feb. 20, 1998

[51] Int. Cl.[7] .......................... B32B 31/04; B42D 19/00

[52] U.S. Cl. .......................... 156/305; 156/182; 156/278; 281/5; 283/61

[58] Field of Search .......................... 156/278, 290, 156/305, 537, 578, 182; 281/5, 16; 283/61, 106

[56] References Cited

U.S. PATENT DOCUMENTS

| | | | |
|---|---|---|---|
| 2,610,868 | 9/1952 | Flament | 282/11.5 |
| 3,778,324 | 12/1973 | Lavigne | 156/257 |
| 3,920,267 | 11/1975 | Lyon, Jr. | 281/5 X |
| 4,351,679 | 9/1982 | Dreher | 156/70 |
| 4,425,181 | 1/1984 | Bahr et al. | 156/497 |
| 4,441,739 | 4/1984 | Cluff et al. | 281/16 |
| 4,589,590 | 5/1986 | McGuire et al. | 229/92.8 |
| 4,812,195 | 3/1989 | Vijuk | 156/357 |
| 4,817,931 | 4/1989 | Vijuk | 270/37 |
| 4,853,063 | 8/1989 | Basgil et al. | 156/238 |
| 4,930,812 | 6/1990 | Howard | 281/5 |
| 5,046,710 | 9/1991 | Vijuk | 270/37 |
| 5,127,676 | 7/1992 | Bockairo | 283/81 |
| 5,193,851 | 3/1993 | Honegger . | |
| 5,225,022 | 7/1993 | Baker et al. | 156/277 |
| 5,417,535 | 5/1995 | Andjelic et al. | 412/2 |
| 5,423,935 | 6/1995 | Benecke et al. | 156/291 |
| 5,458,374 | 10/1995 | Vijuk et al. | 283/81 |
| 5,480,370 | 1/1996 | Gelsinger | 493/475 |
| 5,481,848 | 1/1996 | Tagliaferri et al. | 53/157 |
| 5,490,692 | 2/1996 | Howard | 283/81 |
| 5,667,210 | 9/1997 | Delise, Jr. | 270/37 |
| 5,667,211 | 9/1997 | Reist | 270/52.16 |
| 5,791,689 | 8/1998 | Dovel | 281/5 |

*Primary Examiner*—Curtis Mayes
*Attorney, Agent, or Firm*—Myers Bigel Sibley & Sajovec

[57] ABSTRACT

A method for forming a unitary assembly of a plurality of unitary, multi-panel, folded leaflets. Opposed end edges of the leaflets are positioned adjacent one another. A first continuous adhesive coating is applied, preferably by spraying, onto first end edges of the leaflets and portions of the leaflets adjacent the first end edges and a second continuous adhesive coating is applied, also preferably by spraying, onto second end edges and adjacent portions of the leaflets. In a method for forming a plurality of the assemblies of leaflets, a divider bar is inserted between selected leaflets prior to application of the adhesive coatings such that at least two leaflets are disposed on either side of the bar. Upon removal of the divider bar, portions of the adhesive coatings are removed from between the selected leaflets. Also disclosed are an assembly of booklets and a method for forming the same.

51 Claims, 8 Drawing Sheets

METHOD FOR FORMING AND ASSEMBLY OF FOLDED LEAFLETS

FIELD OF THE INVENTION

The present invention is directed to a method for forming extended text leaflet labels, and, more particularly, to a method for forming a leaflet assembly including a plurality of multi-panel, extended text leaflets detachably secured to one another.

BACKGROUND OF THE INVENTION

Manufacturers of pharmaceutical products are often required by federal regulations to provide substantial amounts of printed warnings and other information with the pharmaceutical products. For many categories of pharmaceutical products, it is not uncommon for required information and conventional formatting to require as much as 500 square inches of printed surface. Because unfolded printed sheets are often difficult to package with the pharmaceutical product and tend to be destroyed and separated from the product during packaging and handling or by the consumer, the industry generally employs folded leaflets. The required information is printed on a sheet and the sheet is thereafter folded along one or more parallel and/or transverse fold lines. In this way, a large amount of printed text is provided on a relatively compact label. Also, much of the printed text is not exposed until the leaflet is unfolded so that it is protected during shipping, handling and the like.

Many pharmaceutical products are not packaged by the manufacturer for direct distribution to the end user. Rather, a pharmaceutical product may be packaged for distribution to a pharmacist or physician who redistributes the product to patients. In some cases, the product is packaged in a bulk container from which the pharmacist or physician takes smaller quantities which he or she individually re-packages. It is often necessary to provide the pharmacist with a number of informational leaflets. Even where the pharmaceutical product is individually prepackaged, it may be more cost-effective and efficient to simply provide the pharmacist or physician with a prescribed number of leaflets for distribution with the individual packages, rather than requiring that the manufacturer match the leaflets with the individual packages.

For the foregoing reasons, pharmaceutical product manufacturers often package a prescribed number of informational leaflets with a package of the product which is intended for distribution to a pharmacist or physician. Both to facilitate placement of the leaflets into the package and handling by the pharmacist or physician, it is desirable that the plurality of leaflets be grouped and held together. However, the leaflets must not be held together in such a manner as to prevent their ultimate separation for individual distribution with the product to patients.

To meet the foregoing needs, rubber bands have been used to hold together stacks of leaflets for placement in packaging. However, this technique suffers from a number of significant drawbacks. Placement of the rubber band about the stack of leaflets is time consuming and labor intensive and, as a result, tends to be cost prohibitive. The rubber bands interfere with or prevent automatic dispensing of the banded leaflets from a conventional magazine because the rubber bands tend to bind in the magazine. Also, the rubber bands may obfuscate bar codes or other indicia on the exposed surfaces of the leaflets which may be scanned during the packaging and handling processes.

It has also been proposed to provide a stack of folded leaflets secured together by adhesively coating opposite end edges of the leaflets. However, to Applicants' knowledge, no suitable method has been proposed for mass producing such assemblies of leaflets. It is important that the adhesive be properly chosen and applied so that the leaflets are neither insufficiently nor overly adhered to one another. Further, in order for the method to be commercially feasible, the method must be cost-effective and convenient. Further, the method should be relatively mess-free and involve little specialized equipment.

SUMMARY OF THE INVENTION

An object of the present invention is to provide a method for securing a plurality of multi-panel, folded leaflets to one another to form a unitary assembly of leaflets from which individual folded leaflets may be readily removed without destroying the folded leaflets.

Another object of the present invention is to provide such a method wherein each assembly of leaflets is formed such that it will not interfere with dispensing of the assembly of leaflets or scanning of bar codes or the like on the assembly of leaflets.

Still another object of the present invention is to provide a method as described above which may be used to consistently, cost effectively and conveniently form such assemblies of leaflets.

An object of the present invention is to provide a unitary assembly of booklets and a method for forming the same.

The present invention is directed to a method for securing a plurality of unitary, multi-panel, folded leaflets together to form a unitary assembly of leaflets such that the leaflets may be readily separated from one another without destroying the leaflets. According to the methods of the present invention, a plurality of the unitary, multi-panel, folded leaflets are positioned such that first and second end edges thereof are aligned and positioned adjacent one another. A first continuous coating of liquid adhesive is applied to the first end edges and a second continuous coating of liquid adhesive is applied to the second end edges. In preferred embodiments, the first and second adhesive coatings are applied to the leaflets by spraying.

The present invention is further directed to a method for forming a plurality of the aforedescribed assemblies of leaflets in a single, convenient, cost-effective operation. According to this method, at least four of the leaflets are provided. A divider bar is inserted between selected leaflets such that at least two leaflets are disposed on either side of the divider bar. The divider bar has a prescribed thickness whereby the leaflets on either side of the divider bar are spaced from one another. Thereafter, a continuous coating of liquid adhesive is applied to the first end edges of the leaflets. The divider bar is removed from between the leaflets whereby portions of the adhesive coating are removed from between the leaflets. The assemblies of leaflets thus formed are thereby detached from one another. In a preferred method, a second continuous coating of liquid adhesive is applied to the second end edges of the leaflets prior to removal of the divider bar.

The present invention is also directed to a unitary assembly of booklets and a method of forming the same. According to the method, a plurality of booklets are provided each having a pair of outer panels joined along a fold and at least one interior panel disposed therebetween. A self-adhesive tab member is applied onto end edges of the panels opposite the fold and onto the pair of outer panels of each booklet. The booklets are positioned such that the folded edges are aligned and positioned adjacent one another and such that the tab members are positioned adjacent one another. A first continuous coating of liquid adhesive is applied to the folded edges and portions of the booklets adjacent the folded edges. A second continuous coating of liquid adhesive is applied onto the tab members but not directly to the end edges opposite the folds.

The foregoing and other objects and aspects of the present invention are explained in detail in the specification set forth below.

DETAILED DESCRIPTION OF THE PREFERRED EMBODIMENTS

The present invention will now be described more fully hereinafter with reference to the accompanying figures, in which preferred embodiments of the invention are shown. This invention may, however, be embodied in many different forms and should not be construed as limited to the embodiments set forth herein. Like numbers refer to like elements throughout. Layers may be exaggerated for clarity.

The term "leaflet" as used herein means a unitary piece formed from a folded sheet and/or formed by a plurality of sheets joined to one another by glue, a staple or other suitable means to form a multi-panel literature assembly. The term "booklet" as used herein refers to a type of leaflet having at least three panels joined along one edge and being free along an opposite edge so that the pages thereof may be opened like a book.

Figure 1:
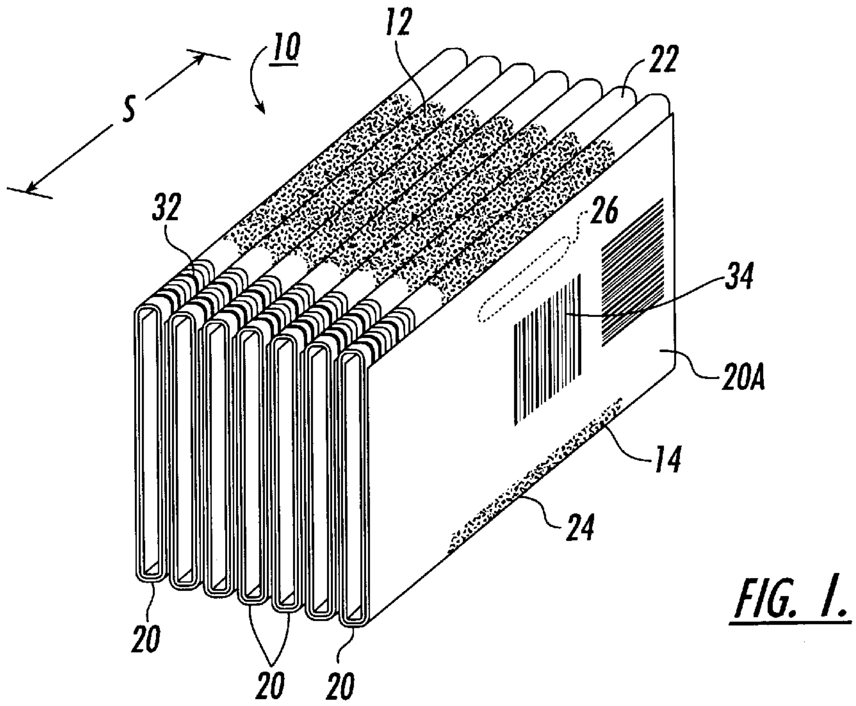
FIG. 1 is a perspective view of an assembly of leaflets formed according to the method of the present invention.
Figure 2:
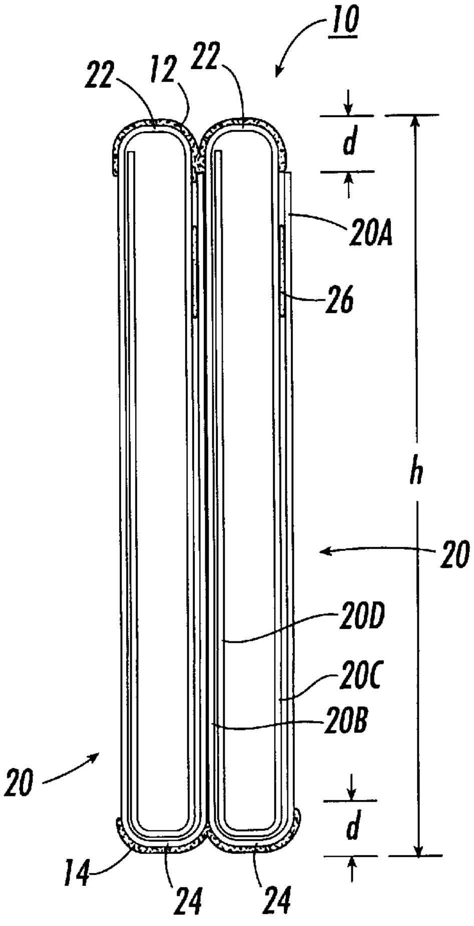
FIG. 2 is a fragmentary, side elevational view of the leaflet assembly of FIG. 1.
Figure 3:
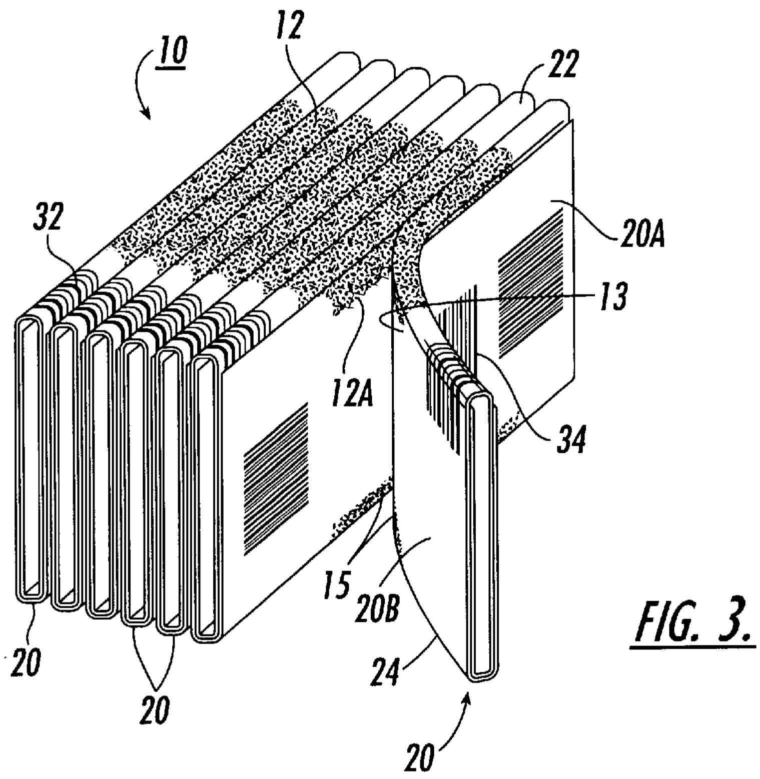
FIG. 3 is a perspective view of the leaflet assembly of FIG. 1 wherein an individual folded leaflet forming a part thereof is partly removed from the leaflet assembly.

The method of the present invention is well suited for forming a unitary assembly of individual, multi-panel, folded leaflets wherein the leaflets are at once securely and compactly joined and also readily detachable from one another. An example of such an assembly of leaflets (hereinafter referred to as the "assembly") is shown in FIGS. 1 and 3 and in fragmentary view in FIG. 2, and is indicated generally by the numeral 10. Assembly 10 includes a plurality (seven (7) as shown in FIGS. 1 and 3) of individual leaflets 20. As best seen in FIG. 2, leaflets 20 are adhered to one another by adhesive 12 along the upper edges 22 thereof and by adhesive 14 along the lower edges 24. Adhesive coating 12 and adhesive coating 14 as shown in FIG. 2 have been exaggerated in size and thickness for the purposes of clarity and explanation. Assembly 10 is particularly well suited as a package insert to provide a number of identical or related individual leaflets for redistribution by a pharmacist or physician. The methods of the present invention may be employed to cost-effectively and efficiently form such assemblies while also enhancing the quality, consistency and performance of the assemblies.

Figure 4:
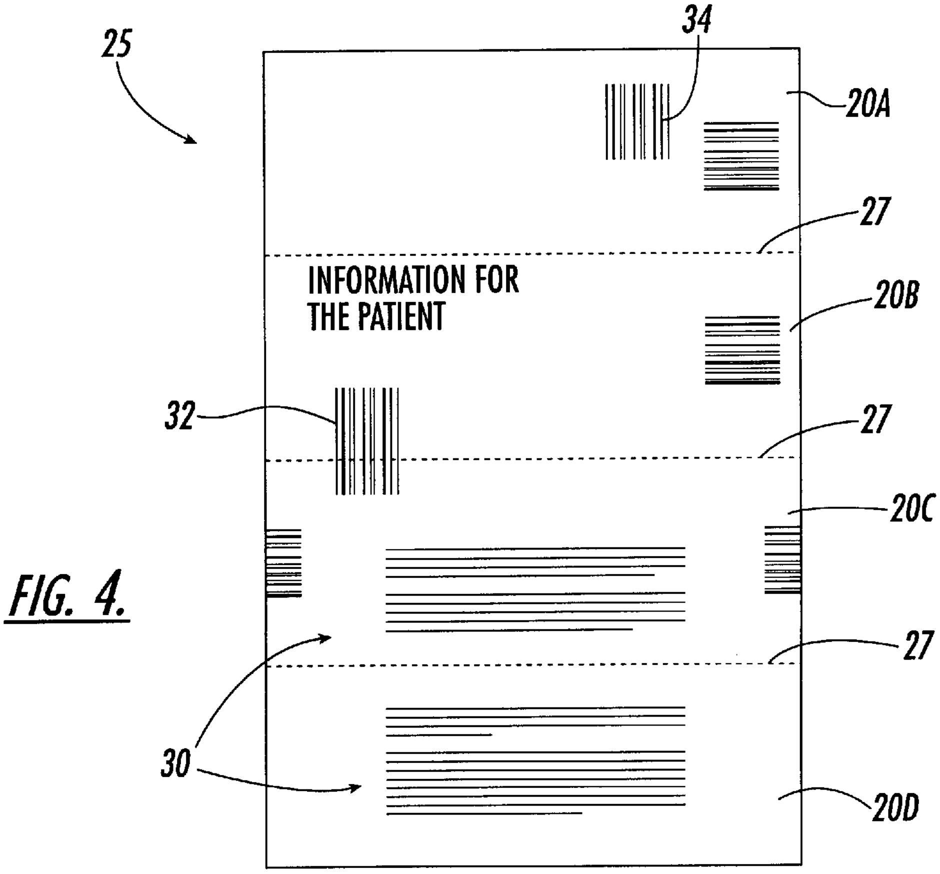
FIG. 4 is a top plan view of a leaflet blank used for forming the folded leaflets of FIG. 1.

Turning to assembly 10 in greater detail, it will be appreciated from the description of the method which follows that more or fewer than seven leaflets 20 may be combined. With reference to FIG. 4, each leaflet 20 is formed from a leaflet sheet blank 25 folded about fold lines 27 to form side-by-side panels 20A, 20B, 20C and 20D. Various informational indicia 30 such as directions for use and warnings are printed on each side of blank 25. Bar codes 32, 34 are also printed on blank 25. Each leaflet 20 includes an adhesive spot 26 (see FIGS. 1 and 2) which secures panel 20A to panel 20C and thereby holds the leaflet closed. Preferably, panel 20A does not extend to upper edge 22. While each leaflet 20 as shown has four spirally folded (i.e., folded over and over) panels, folded leaflets of other configurations may be used as well. For example, leaflets having more panels or of the type having folds located at right angles to one another may be employed.

In assembly 10, leaflets 20 are closely stacked in side-by-side, parallel arrangement as shown such that the panel 20B of each leaflet is disposed immediately adjacent to the panel 20A of the next leaflet. Adhesive 12 is disposed as a lengthwise and widthwise continuous coating across the upper edges 22 of the leaflets with portions of the adhesive extending downwardly between the leaflets. By "continuous," it is meant that the coating extends substantially without interruption between the side and end edges of the adhesive strip. The side and end edges of the adhesive coating are preferably substantially parallel and uniformly spaced apart, however, the distances between the side edges and the end edges of the adhesive may be variable. The adhesive coating will generally rise and fall with the topography of the leaflet ends. Adhesive 12 thereby secures the leaflets together by providing a continuous, coherent binding substrate and also by adhering the opposed panel regions of adjacent leaflets directly to one another. Similarly, adhesive 14 extends continuously across end edges 24 and upwardly between the leaflets.

Preferably, adhesive coatings 12, 14 extend a distance D (FIG. 2) from the respective end edges and between the adjacent leaflets of no greater than ¼ inch and, more preferably, a distance D of between about ⅛ to 1/16 inch. Preferably, adhesive coatings 12, 14 have a width S (FIG. 1) across the lengths of the end edges of no greater than 3 inches and, more preferably, of between about 2⅞ and 2¾ inches.

When the user desires to remove a leaflet 20 from assembly 10, he or she simply grabs one end of an outermost leaflet and pulls the end away from the assembly. With reference to FIG. 3, a leaflet 20 of assembly 10 is shown therein partly removed. Because only relatively small regions of the leaflets adjacent the end edges are adhered, only limited regions 13, 15 bear adhesive residue or are damaged by tearing of the adhesive from the leaflets. Also, the use of a preferred adhesive, as discussed is more detail below, minimizes tearing of the leaflet. Each leaflet 20 may be stripped away in turn as desired.

It will be readily appreciated by those of skill in the art upon a reading of the foregoing that assembly 10 overcomes several disadvantages of the prior art. For example, bar codes 32 and 34 are exposed and may be scanned by electronic means as desired. Further, assembly 10 may be dispensed from a conventional magazine without risk of binding as in the case of rubber banded leaflets.

Figure 5:
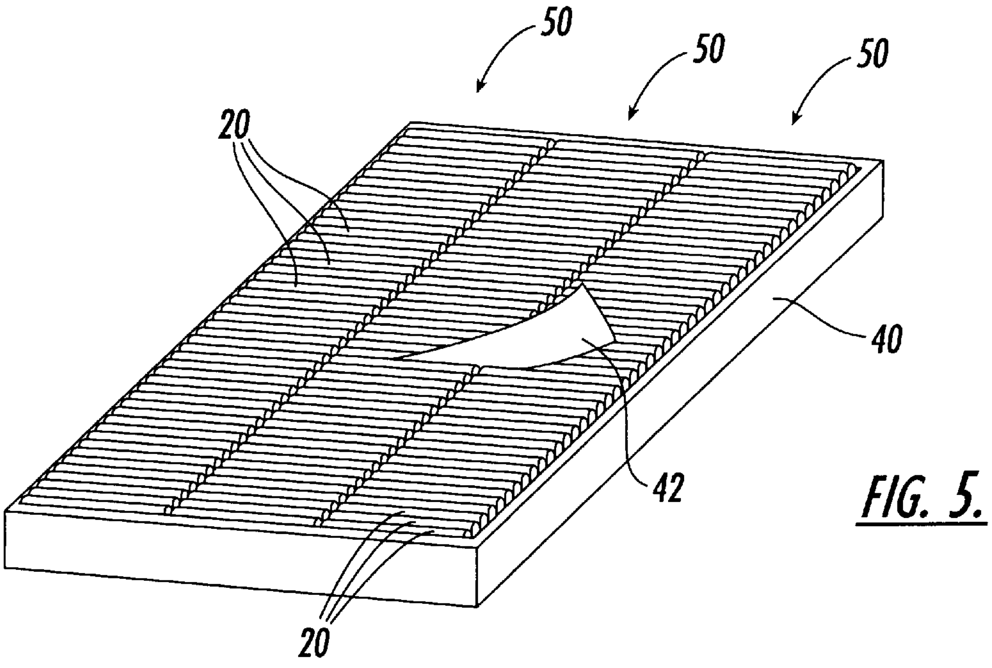
FIG. 5 is a perspective view of a sub-tray for forming leaflet assemblies as shown in FIG. 1, the sub-tray containing a plurality of individual folded leaflets.

Assemblies 10, as described above, may be formed by practice of a preferred method according to the present invention as follows. A plurality of leaflets 20 are formed by suitable means such as a pharmaceutical folder available from Vijuk of Elmhurst, Ill. With reference to FIG. 5, leaflets 20 are placed in sub-tray 40. Sub-tray 40 may be formed, for example, of cardboard. The leaflets are placed in the sub-tray 40 such that they stand on edges 22 (edges 24 being exposed and facing upwardly) and are aligned in three parallel rows 50. The number of leaflets in each row should be a multiple of the number of leaflets to be included in each assembly 10 (in this case, seven).

Figure 6:
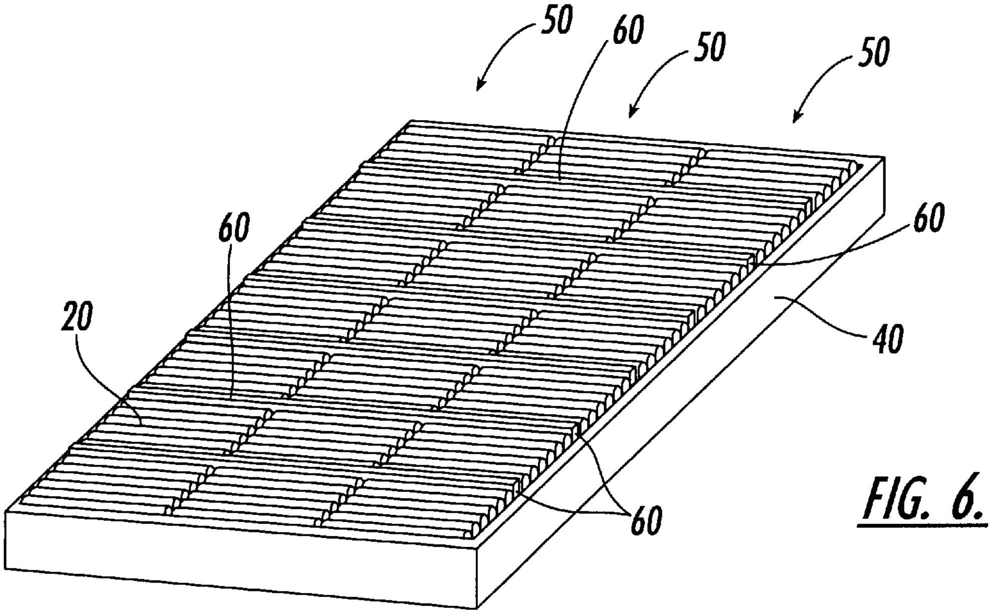
FIG. 6 is a perspective view of the sub-tray and folded leaflets of FIGS. 1 and 5 wherein a plurality of divider bars according to the present invention are inserted in the sub-tray between selected folded leaflets.
Figure 7:
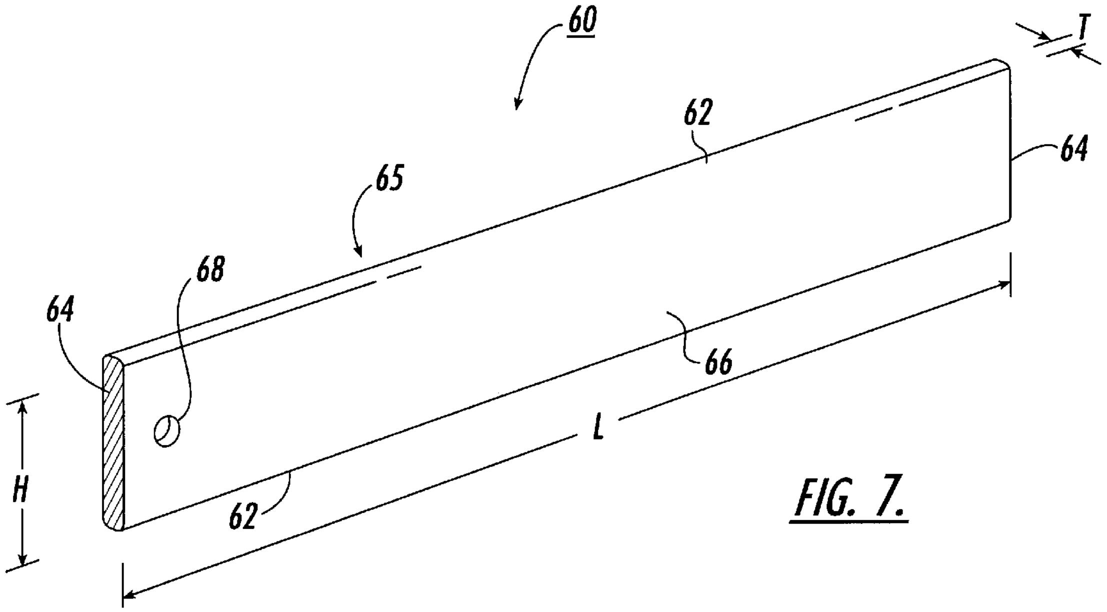
FIG. 7 is a perspective view of a divider bar according to the present invention.

With reference to FIGS. 6 and 7, a plurality of divider or spacer bars 60 are placed between the leaflets. More particularly, divider bars 60 are placed on each end of sub-tray 40 and between selected numbers of leaflets 20. For example, to form assembly 10 as described divider bars 60 are inserted between the seventh and eighth leaflets in each row, the fourteenth and fifteenth leaflets in each row, the twenty-first and twenty-second leaflets in each row and so forth. Each divider bar 60 extends the full width of sub-tray 40 and thereby separates the selected leaflets in each of the three rows, as shown in FIG. 7. In order to assist in identifying the proper locations for placement of divider bars 60, paper strips 42 of colors contrasting with the leaflets themselves may be placed between the selected leaflets as they are loaded into tray 40. The colored strips are removed following insertion of the respective divider bars 60.

Turning to divider bars 60 in more detail, an exemplary divider bar 60 is shown in FIG. 7. Divider bar 60 is preferably formed of TEFLON® fluoropolymer resin from E. I. du Pont de Nemours & Co. of Wilmington, Del. or of a suitable metal coated with TEFLON® resin. Divider bar 60 has height H which is the same as the height h of each leaflet 20 (see FIG. 2). Divider bar 60 has a length L extending between ends 64 which is slightly less than the interior width of tray 40. Opposed edge walls 62 extend between end walls 64 and between opposed face walls 65 and 66. Edge walls 62 have width T which is preferably at least 3/16 inch and, more preferably, is between about 3/16 and ¼ inch. Hole 68 is formed through divider bar 60 to receive a hook or wire for suspending or binding a plurality of divider bars 60 together.

Figure 8:
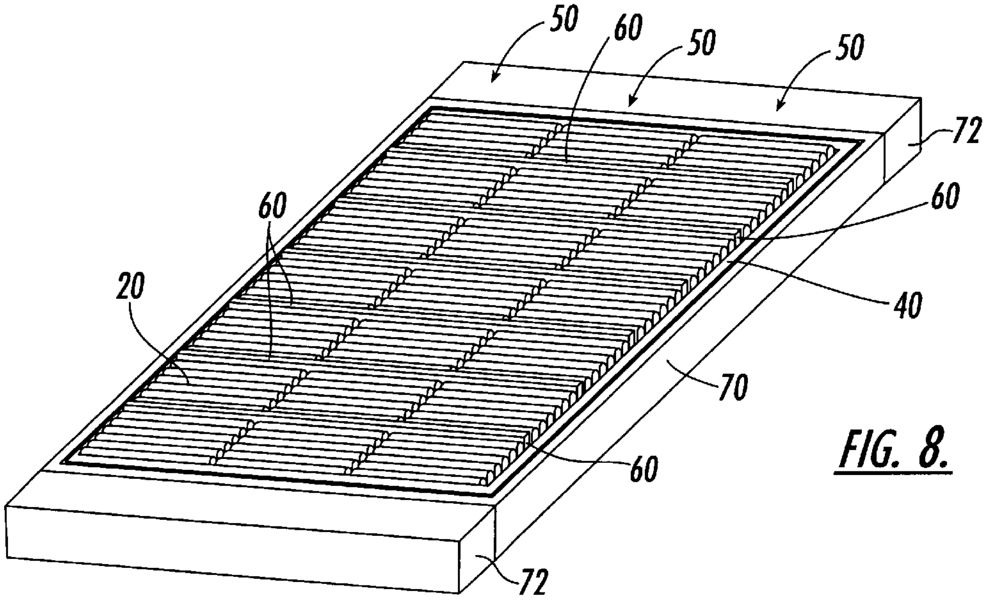
FIG. 8 is a perspective view of an outer tray according to the present invention with the sub-tray, folded leaflets and divider bars disposed therein.

With reference to FIG. 8, sub-tray 40 (with leaflets 20 and divider bars 60 therein) is placed in outer tray 70. Outer tray 70 is preferably formed from metal or other rigid material and has extended bumpers 72, preferably formed of nylon or the like. Preferably, tray 70 is TEFLON® coated.

Figure 9:
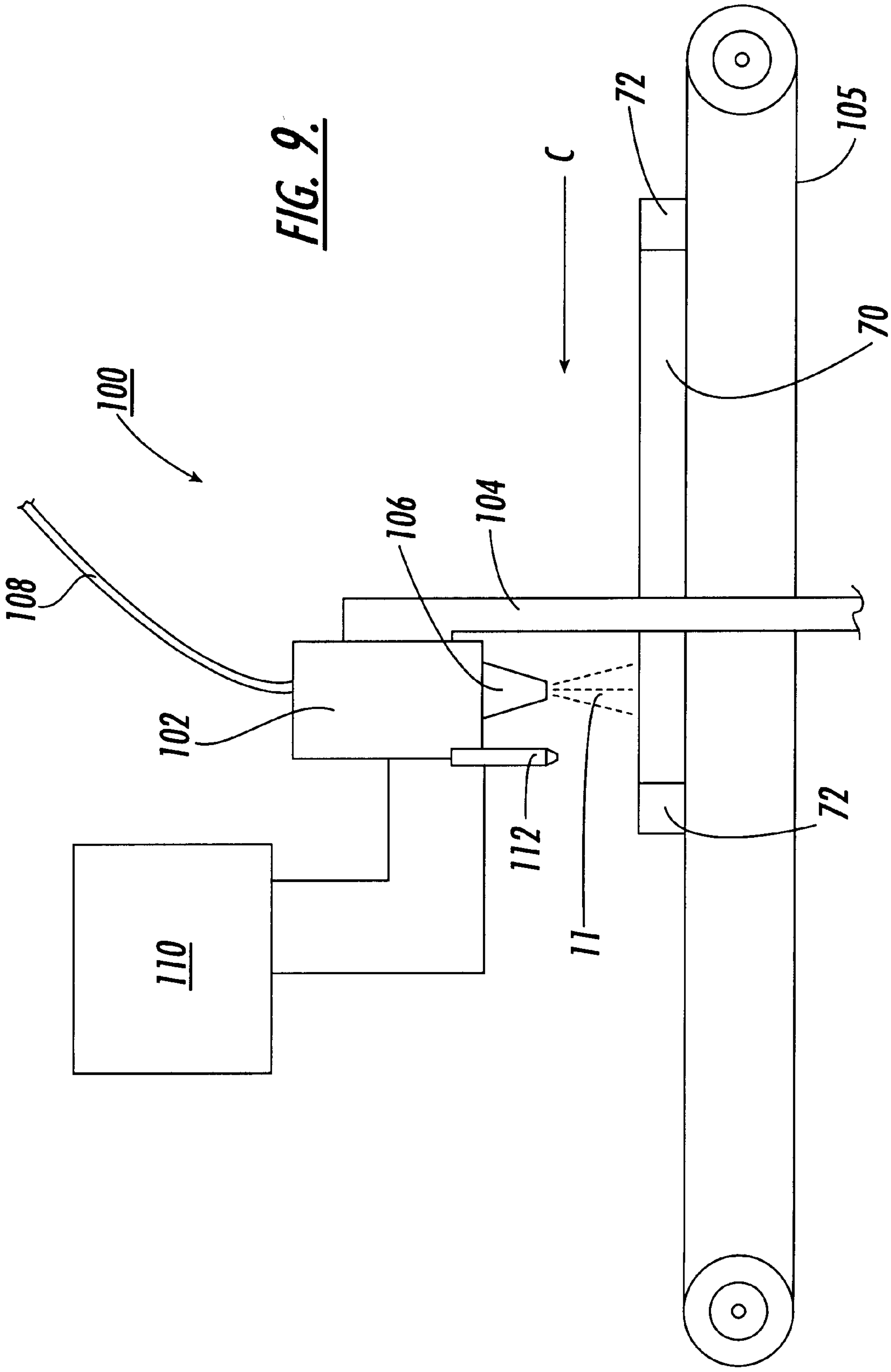
FIG. 9 is a schematic diagram of an apparatus for transporting and applying adhesive to the folded leaflets of FIG. 1.
Figure 10:
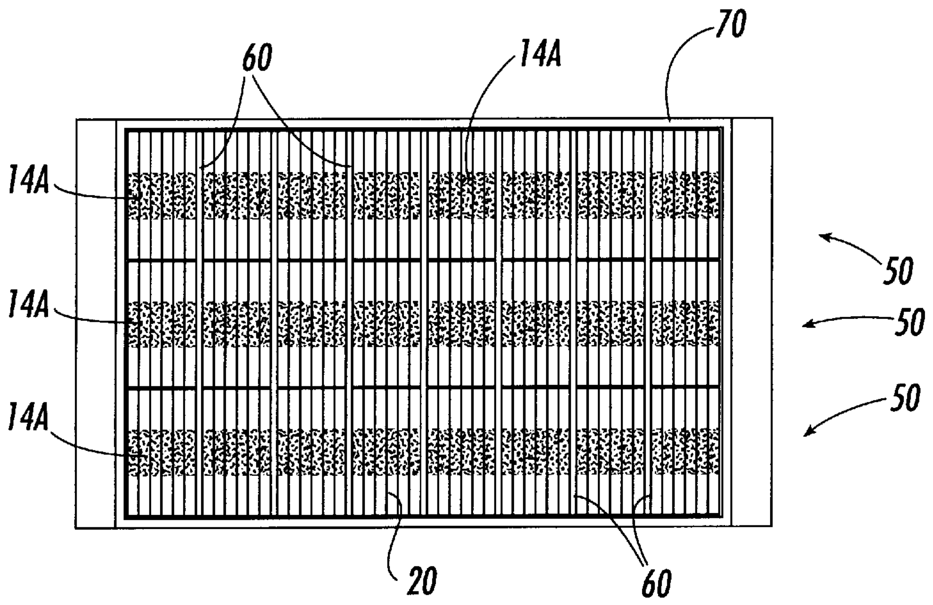
FIG. 10 is a schematic, top view of the trays, folded leaflets and divider bars wherein a first set of strips of adhesive have been applied to the leaflets and divider bars of FIG. 8.

Tray 70 is then placed on conveyor 105 of adhesive applying station 100 (see FIG. 9). Station 100 has adhesive applicator head 102 with adhesive supply 108 and three side-by-side dispensing nozzles 106 spaced across the width of the conveyor (only one dispensing nozzle is visible in FIG. 9). Adhesive applicator head 102 is preferably a pressure-type adhesive dispenser such as an LB-120 dispenser available from Nordson Corporation of Westlake, Ohio. Head 102 is supported over conveyor 105 by yoke 104. Conveyor 105 carries tray 72 in direction C beneath nozzles 106. Electronic eye 112 detects the leading edge of tray 70 and generates a signal to controller 110 in response thereto. After a prescribed waiting period to allow the conveyor to position the first column of leaflets 20 beneath nozzles 106, controller 110 actuates head 102 to spray adhesive 11 from nozzles 106. Nozzles 106 spray adhesive 11 in continuous adhesive strips 14A running the lengths of rows 50 of leaflets 20 as shown in FIG. 10. More particularly, adhesive strips 14A coat end edges 24 of the leaflets and edge walls 62 of the divider bars. By "continuous," it is meant that the coating extends substantially without interruption between the side and end edges of the adhesive strip. The side and end edges of the adhesive coating are preferably substantially parallel and uniformly spaced apart, however, the distances between the side edges and the end edges of the adhesive may be variable. The adhesive coating will generally rise and fall with the topography of the leaflet and divider bar ends. The duration of the dispensing of the adhesive is controlled by a programmable logic controller (PLC) in controller 110 such that the dispensing is terminated after a prescribed period corresponding to the last column of leaflets passing beneath the nozzles.

Figure 12:
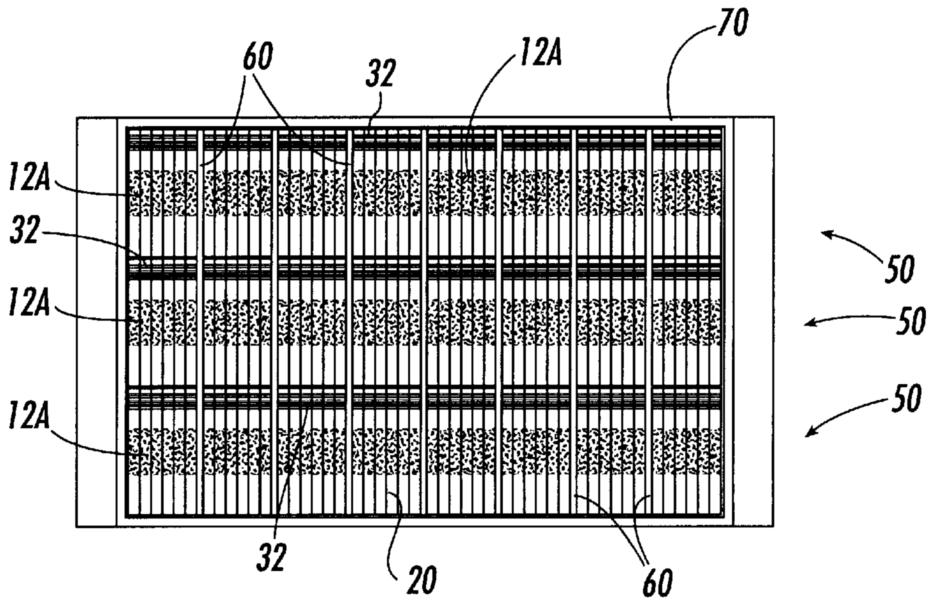
FIG. 12 is a schematic, top plan view of the trays, leaflets and divider bars of FIG. 11 wherein a second set of adhesive strips have been applied to the leaflets and divider bars.
Figure 11:
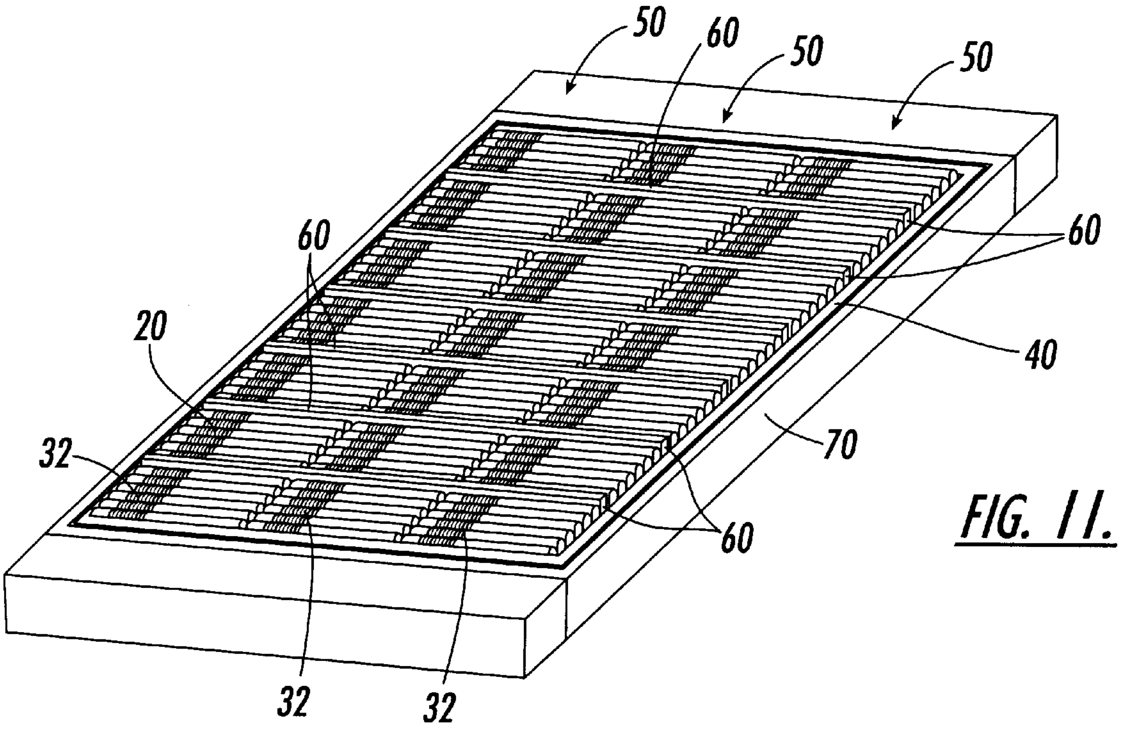
FIG. 11 is a perspective view of the outer tray, sub-tray, folded leaflets and divider bars of FIG. 10 wherein the leaflets and divider bars have been inverted relative to the arrangement of FIG. 10.

Following application of adhesive strips 14A to the leaflets, the adhesive is allowed to dry. The rows of leaflets are then flipped or inverted into another sub-tray 40 such that the leaflets are stood on end edges 24 with end edges 22 facing upwardly and exposed. Notably, divider bars 60 are inverted with the leaflets. The sub-tray (with the leaflets and divider bars therein) is again placed in outer tray 70, as shown in FIG. 11. Bar codes 32 disposed on upper edges 22 of the leaflets provide a convenient visual indicator to ensure that there are no misplaced or misoriented leaflets 20. Tray 70 and the leaflets are again run through adhesive applying station 100 where head 102 sprays continuous adhesive strips 12A (see FIG. 12) along the upper edges 22 of leaflets 20 and edge walls 62 of the divider bars.

After application of adhesive strips 12A, adhesive strips 12A are allowed to dry. Once adhesive strips 12A have dried, divider bars 60 are removed from between the leaflets. In doing so, voids are formed in the adhesive strips 12A and 14B, thereby separating the individual assemblies 10 from one another. The adhesive residue is easily removed from the TEFLON® coated divider bars in preparation for the next run.

It has been determined that the best results are obtained when certain types and parameters of adhesives are used for adhesive coatings 12 and 14. Adhesive 11 dispensed from head 102, which ultimately forms adhesive coatings 12, 12A, 14, 14A, is a liquid adhesive. The specific gravity of adhesive 11 should be no greater than 1.04. Preferably, the specific gravity of the adhesive 11 is between about 1.025 and 1.035, and, more preferably, the specific gravity is 1.03. The adhesive 11 is preferably a high performance water-based adhesive. Suitable adhesives include Adhesive Product No. 3715 EN from H. B. Fuller Co. of St. Paul, Minn., which may be mixed with water as needed. The use of liquid adhesive enables the adhesive to be properly sprayed or blown from the dispensing nozzle. Also, the liquid adhesive when provided in the prescribed viscosities penetrates between the leaflets as desired. The preferred specific gravities and flow rates ensure sufficient securement between the leaflets while preventing adhesive "lock up" between the leaflets (i.e., the leaflets being so strongly secured to one another that separation of the leaflets causes substantial damage to the leaflet.)

Figure 13:
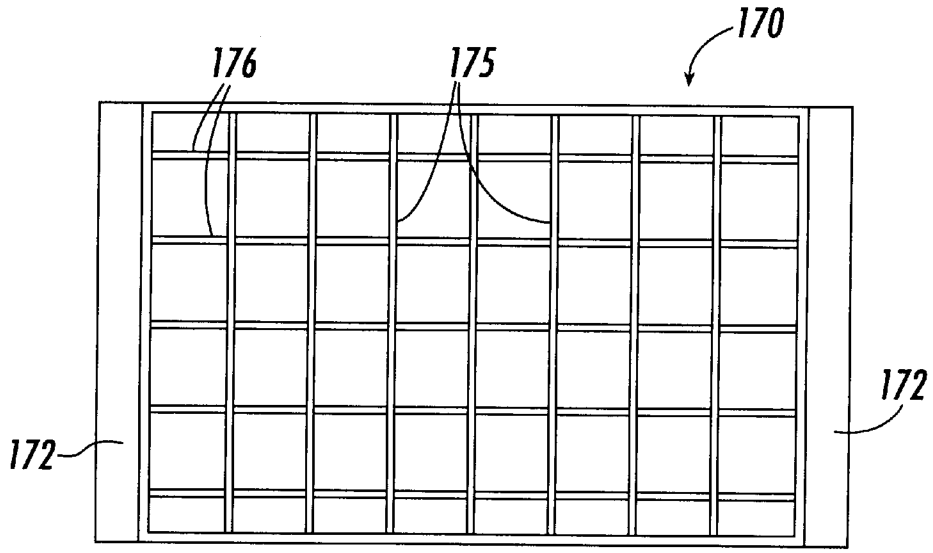
FIG. 13 is a bottom plan view of a tray according to a further embodiment of the present invention wherein the bottom wall thereof is formed by a grate or screen.

Optionally, assemblies 10 may be formed by a method according to the present invention using fewer steps by use of an outer tray 170 as shown in FIG. 13. Tray 170 has intersecting lengthwise bars 176 and widthwise bars 175 extending along the bottom thereof to form a grate or screen in place of a solid bottom wall. Tray 170 also has bumpers 172 corresponding to bumpers 72. Adhesive may be applied by adhesive applying station 100 in a first pass as described above. Then, rather than removing the leaflets from tray 170, inverting the leaflets and replacing the leaflets into the tray, adhesive may be applied to the opposed edges of the leaflets by dispensing adhesive from underneath tray 170 and through the grate. Preferably, bars 175, 176 are coated with TEFLON® resin. Optionally, the grate may be configured such that the sizes of the apertures between the cross members is adjustable. Further, widthwise bars 175 may be eliminated and lengthwise bars 176 may be spaced such that the adhesive may be sprayed between them and onto the leaflets while eliminating or minimizing overspray onto bars 176.

Figure 14:
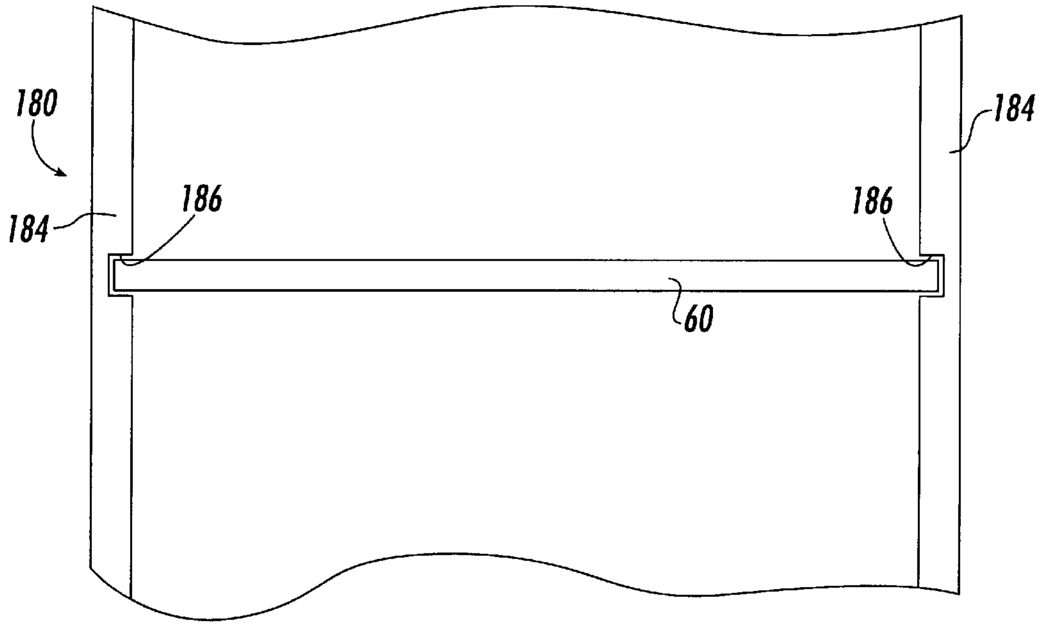
FIG. 14 is a fragmentary, top plan view of a tray according to a further embodiment of the present invention having integral slots in the sidewalls thereof for receiving the ends of a divider bar.

Alternatively, a tray 180, as shown in fragmentary, top plan view in FIG. 14, may be used, preferably without sub-tray 40. Sidewalls 184 of tray 180 have slots 186 slightly larger than the width T of divider bars 60. While only one pair of slots 186 are shown, preferably a pair of slots 186 are provided for each divider bar 60. Divider bars 60 are slid downwardly into slots 186. Slots 186 assist in positively locating the divider bars to ensure uniform spacing (and, thus, uniformity of the end product). Also, slots 186 may be used to facilitate location of the appropriate positions for insertion of the divider bars between selected leaflets.

Figure 15:
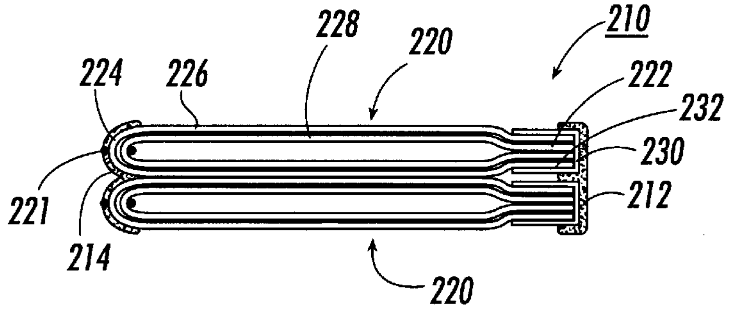
FIG. 15 is a side elevational view of an assembly of booklets according to the present invention.
Figure 16:
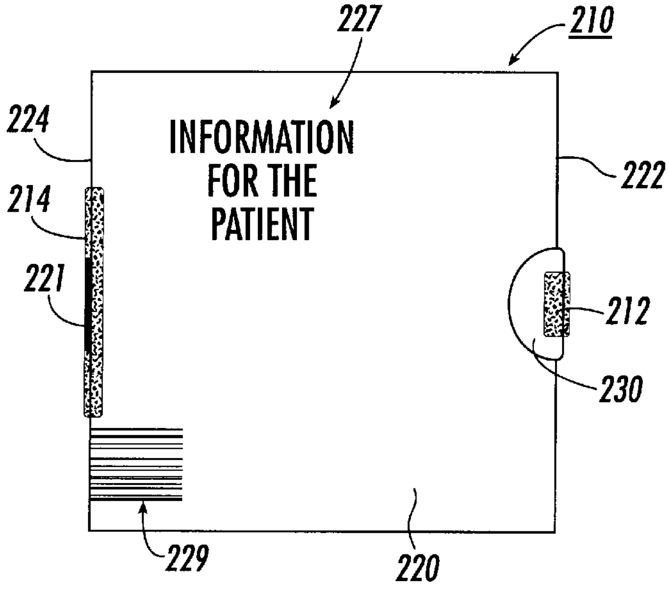
FIG. 16 is an end elevational view of the assembly of booklets of FIG. 15.

The methods of the present invention may also be used to form assemblies of booklets. With reference to FIGS. 15 and 16, an exemplary assembly of booklets 210 including two combined individual booklets 220 is shown therein. It will be appreciated from the description which follows that a greater number of booklets may be combined. Interior folded sheet 228 is nested in exterior folded sheet 226 to form a four-panel (eight page) booklet. Informational indicia 227 and bar code 229 are printed on the exterior of the booklet. The folds of the interior and exterior folded sheets are joined by staple 221. The fold of exterior sheet 226 forms an end edge 224. Panel free edges 222 are formed opposite edge 224. Tab 230 formed of paper or other flexible material is applied over free edges 222 and is secured thereto by adhesive 232. Tab 230 thereby holds each booklet 220 closed so that the panels cannot separate from one another.

End edges 224 are secured together by adhesive 214 in the same manner as discussed above with regard to assembly 10. Tabs 230 are secured to one another by adhesive 212. Notably, no adhesive is disposed on free edges 222, so that the panels of each booklet are secured together only by tab 230.

Methods for forming booklets 220 will be readily apparent to those of ordinary skill in the art. Tabs 230 may be applied by hand or by a wafer sealer. The binding of the booklets is similar to the method as described above for forming assembly of leaflets 10. Folded end edges 224 correspond to end edges 24 and are adhered together by adhesive 214 in the same manner. However, adhesive is not applied to opposed end edges 222, but rather adhesive 212 is blown only onto tabs 230.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for forming a unitary assembly of leaflets, the assembly of leaflets including at least two unitary, multi-panel, folded leaflets secured together by adhesive, said method comprising the steps of:

providing at least two unitary, multi-panel, folded leaflets, each of the leaflets having first and second opposed end edges;

positioning the folded leaflets such that the first end edges thereof are aligned and positioned adjacent one another and such that the second end edges thereof are aligned and positioned adjacent one another; and thereafter spraying a first continuous coating of liquid adhesive onto the first end edges such that the first adhesive only partially covers the first end edges and portions of the leaflets adjacent the first end edges; and spraying a second continuous coating of liquid adhesive onto the second end edges such that the second adhesive only partially covers the second end edges and portions of the leaflets adjacent the second end edges.

2. The method of claim 1 wherein said steps of spraying the first and second adhesives include spraying a water-based adhesive.

3. The method of claim 1 wherein said steps of positioning the leaflets and spraying the first and second adhesives are executed such that the first and second adhesive coatings extend inwardly from the first and second end edges, respectively, no more than ¼ inch.

4. The method of claim 1 wherein said step of providing a plurality of the leaflets includes providing a plurality of leaflets formed from a single strip folded about at least a first fold and a second fold, the first fold formed along the first end edge and the second fold formed along the second end edge.

5. The method of claim 1 wherein said step of spraying the second adhesive follows said step of spraying the first adhesive.

6. A method for forming a unitary assembly of leaflets, the assembly of leaflets including at least two unitary, multi-panel, folded leaflets secured together by adhesive, said method comprising the steps of:

providing at least two unitary, multi-panel, folded leaflets, each of the leaflets having first and second opposed end edges:

positioning the folded leaflets such that the first end edges thereof are aligned and positioned adjacent one another and such that the second end edges thereof are aligned and positioned adjacent one another:

thereafter spraying a first continuous coating of liquid adhesive downwardly onto the first end edges such that the first adhesive covers the first end edges and portions of the leaflets adjacent the first end edges;

thereafter spraying a second continuous coating of liquid adhesive downwardly onto the second end edges such that the second adhesive covers the second end edges and portions of the leaflets adjacent the second end edges; and between said step of spraying the first adhesive and said step of spraying the second adhesive, inverting the leaflets.

7. A method for forming a unitary assembly of leaflets, the assembly of leaflets including at least two unitary, multi-panel, folded leaflets secured together by adhesive, said method comprising the steps of:

providing at least two unitary, multi-panel, folded leaflets, each of the leaflets having first and second opposed end edges;

positioning the folded leaflets such that the first end edges thereof are aligned and positioned adjacent one another and such that the second end edges thereof are aligned and positioned adjacent one another; and thereafter spraying a first continuous coating of liquid adhesive downwardly onto the first end edges such that the first adhesive covers the first end edges and portions of the leaflets adjacent the first end edges; and spraying a second continuous coating of liquid adhesive downwardly onto the second end edges such that the second adhesive covers the second end edges and portions of the leaflets adjacent the second end edges; and wherein said step of positioning the leaflets includes placing the leaflets in a tray, and further including the steps of placing the tray on a conveyor and conveying the tray with the conveyor beneath an adhesive applicator, and wherein said step of spraying a first continuous adhesive coating includes spraying the first adhesive from the adhesive applicator onto the leaflets.

8. The method of claim 7 wherein said step of placing the leaflets in a tray includes forming a plurality of side-by-side rows of the leaflets and said step of spraying the first continuous adhesive coating includes spraying a plurality of spaced apart, substantially parallel streams of the first adhesive onto the leaflets to form discrete adhesive strips, at least one of the adhesive strips being sprayed onto each row of leaflets.

9. The method of claim 7 wherein said step of spraying the second adhesive follows said step of spraying the first adhesive.

10. A method for forming at least two unitary assemblies of leaflets, each assembly of leaflets including at least two unitary, multi-panel, folded leaflets secured together by adhesive, said method comprising the steps of:

providing at least four of the unitary, multi-panel, folded leaflets, each of the leaflets having first and second opposed end edges;

positioning the leaflets such that the first end edges thereof are aligned and positioned adjacent one another and such that the second end edges thereof are aligned and positioned adjacent one another;

inserting a divider bar between selected ones of the leaflets such that at least two first leaflets are disposed on one side of the divider bar and at least two second leaflets are disposed on an opposite side of the divider bar, the divider bar having a prescribed thickness whereby the first leaflets are spaced apart from the second leaflets; and thereafter applying a first continuous coating of liquid adhesive onto the first end edges of the first leaflets, the divider bar and the first end edges of the second leaflets;

applying a second continuous coating of liquid adhesive onto the second end edges of the first leaflets, the divider bar and the second end edges of the second leaflets; and thereafter removing the divider bar from between the first leaflets and the second leaflets whereby portions of the first and second continuous adhesive coatings disposed on the divider bar are removed from between the first leaflets and the second leaflets.

11. The method of claim 10 wherein said steps of applying the first and second adhesives include spraying the first and second adhesives onto the leaflets.

12. The method of claim 10 wherein said steps of applying the first and second adhesives include applying a water-based adhesive.

13. The method of claim 10 wherein said steps of positioning the leaflets and applying the first and second adhesives are executed such that the first and second adhesive coatings extend inwardly from the first and second end edges, respectively, no more than ¼ inch.

14. The method of claim 10 wherein the step of positioning the leaflets includes placing the leaflets in a tray, and further including the steps of placing the tray on a conveyor and conveying the tray with the conveyor beneath an adhesive applicator, and wherein said step of applying a first continuous adhesive coating includes dispensing the first adhesive from the adhesive applicator onto the leaflets.

15. The method of claim 14 wherein said step of placing the leaflets in a tray includes forming a plurality of side-by-side rows of the leaflets, and said step of applying the first continuous adhesive coating includes applying a plurality of spaced apart, substantially parallel streams of the first adhesive to the leaflets to form discrete adhesive strips, at least one of the adhesive strips being applied to each row of leaflets.

16. The method of claim 15 wherein said step of inserting the divider bar includes simultaneously inserting the divider bar between selected leaflets in each side-by-side row.

17. The method of claim 14 wherein the tray has an outer surface formed of a fluoropolymer resin.

18. The method of claim 14 wherein the tray has a bottom wall having openings formed therein and said step of applying the second adhesive includes applying the second adhesive onto the second end edges through the openings.

19. The method of claim 18 wherein the tray includes means for selectively adjusting the sizes of the openings and including the step of adjusting the sizes of the openings prior to applying the second adhesive.

20. The method of claim 14 wherein the tray includes a locator slot formed therein and wherein said step of inserting the divider bar includes inserting the divider bar into the locator slot.

21. The method of claim 10 wherein said step of inserting a divider bar includes inserting a divider bar having an outer surface formed of a fluoropolymer resin.

22. The method of claim 10 wherein said step of providing a plurality of the leaflets includes providing a plurality of leaflets formed from a single strip folded about at least a first fold and a second fold, the first fold formed along the first end edge and the second fold formed along the second end edge.

23. The method of claim 10 wherein said step of spraying the second adhesive follows said step of spraying the first adhesive.

24. The method of claim 23 further including, between said step of applying the first adhesive and said step of applying the second adhesive, the step of inverting the leaflets, and wherein the first and second adhesives are each applied downwardly.

25. A method for forming at least two unitary assemblies of leaflets, each assembly of leaflets including at least two unitary, multi-panel, folded leaflets secured together by adhesive, said method comprising the steps of:

providing at least four of the unitary, multi-panel, folded leaflets, each of the leaflets having first and second opposed end edges;

positioning the leaflets such that the first end edges thereof are aligned and positioned adjacent one another and such that the second end edges thereof are aligned and positioned adjacent one another;

inserting a divider bar between selected ones of the leaflets such that at least two first leaflets are disposed on one side of the divider bar and at least two second leaflets are disposed on an opposite side of the divider bar, the divider bar having a prescribed thickness whereby the first leaflets are spaced apart from the second leaflets; and thereafter applying a continuous coating of liquid adhesive onto the first end edges of the first leaflets, the divider bar and the first end edges of the second leaflets; and removing the divider bar from between the first leaflets and the second leaflets whereby portions of the first continuous adhesive coating disposed on the divider bar are removed from between the first leaflets and the second leaflets.

26. The method of claim 25 wherein said step of applying the adhesive includes spraying the adhesive onto the leaflets.

27. The method of claim 25 wherein said step of applying the adhesive includes applying a water-based adhesive.

28. The method of claim 25 wherein said steps of positioning the leaflets and applying the adhesive are executed such that the adhesive coating extends inwardly from the first end edges no more than ¼ inch.

29. The method of claim 25 wherein the step of positioning the leaflets includes placing the leaflets in a tray, and further including the steps of placing the tray on a conveyor and conveying the tray with the conveyor beneath an adhesive applicator, and wherein said step of applying a continuous adhesive coating includes dispensing the adhesive from the adhesive applicator onto the leaflets.

30. The method of claim 29 wherein said step of placing the leaflets in a tray includes forming a plurality of side-by-side rows of the leaflets, and said step of applying the continuous adhesive coating includes applying a plurality of spaced apart, substantially parallel streams of the adhesive to the leaflets to form discrete adhesive strips, at least one of the adhesive strips being applied to each row of leaflets.

31. The method of claim 30 wherein said step of inserting the divider bar includes simultaneously inserting the divider bar between selected leaflets in each side-by-side row.

32. The method of claim 29 wherein the tray has an outer surface formed of a fluoropolymer resin.

33. The method of claim 29 wherein the tray includes a locator slot formed therein and wherein said step of inserting the divider bar includes inserting the divider bar into the locator slot.

34. The method of claim 25 wherein said step of inserting a divider bar includes inserting a divider bar having an outer surface formed of a fluoropolymer resin.

35. The method of claim 25 wherein said step of providing a plurality of the leaflets includes providing a plurality of leaflets formed from a single strip folded about at least a first fold and a second fold, the first fold formed along the first end edge and the second fold formed along the second end edge.

36. The method of claim 25 wherein said step of spraying the second adhesive follows said step of spraying the first adhesive.

37. A method for forming a unitary assembly of booklets, the assembly of booklets including at least two unitary, multi-panel booklets secured together by selectively located adhesive coatings, said method comprising the steps of:

providing at least two of the booklets, each booklet including a pair of outer panels joined along a fold, at least one interior panel disposed between the outer panels, a first end edge formed along the fold, and a plurality of second end edges formed along the outer and interior panels opposite the first end edge;

applying a self-adhesive tab member onto the second end edges and the pair of outer panels of each booklet;

positioning the booklets such that the first end edges are aligned and positioned adjacent one another and such that the tab members are positioned adjacent one another;

applying a first continuous coating of liquid adhesive onto the first end edges such that the first adhesive covers the first end edges and portions of the booklets adjacent the first end edges whereby the booklets are secured to one another along the first end edges thereof by the first adhesive; and applying a second continuous coating of adhesive onto the tab members such that the second adhesive covers the tab members but is not disposed directly on the second end edges whereby the tab members are secured to one another by the second adhesive.

38. The method of claim 37 wherein said steps of applying the first and second adhesives include spraying the first and second adhesives onto the booklets and the tab members.

39. The method of claim 37 wherein said steps of applying the first and second adhesives include applying a water-based adhesive.

40. The method of claim 37 wherein said steps of positioning the booklets and applying the first and second adhesives are executed such that the first and second adhesive coatings extend inwardly from the first and second end edges, respectively, no more than ¼ inch.

41. The method of claim 37 further including, between said step of applying the first adhesive and said step of applying the second adhesive, the step of inverting the booklets, and wherein the first and second adhesives are each applied downwardly.

42. The method of claim 37 wherein the step of positioning the booklets includes placing the booklets in a tray, and further including the steps of placing the tray on a conveyor and conveying the tray with the conveyor beneath an adhesive applicator, and wherein said step of applying a first continuous adhesive coating includes dispensing the first adhesive from the adhesive applicator onto the booklets.

43. The method of claim 42 wherein said step of placing the booklets in a tray includes forming a plurality of side-by-side rows of the booklets, and said step of applying the first continuous adhesive coating includes applying a plurality of spaced apart, substantially parallel streams of the first adhesive to the booklets to form discrete strips of adhesive, at least one of the adhesive strips being applied to each row of booklets.

44. The method of claim 42 wherein the tray has an outer surface formed of a fluoropolymer resin.

45. The method of claim 42 wherein the tray has a bottom wall having openings formed therein and said step of applying the second adhesive includes applying the second adhesive onto the tab members through the openings.

46. The method of claim 45 wherein the tray includes means for selectively adjusting the sizes of the openings and including the step of adjusting the sizes of the openings prior to applying the second adhesive.

47. The method of claim 37:

wherein said step of providing the booklets includes providing at least four of the booklets;

further including the step of inserting a divider bar between selected ones of the booklets such that at least two first booklets are disposed on one side of the divider bar and at least two second booklets are disposed on an opposite side of the divider bar, the divider bar having a prescribed thickness whereby the first booklets are spaced apart from the second booklets;

wherein said step of applying the first adhesive includes applying the first adhesive to the divider bar and said step of applying the second adhesive includes applying the second adhesive to the divider bar; and further including the step of removing the divider bar from between the first booklets and the second booklets whereby portions of the first and second continuous adhesive coatings disposed on the divider bar are removed from between the first booklets and the second booklets.

48. The method of claim 47 wherein said step of positioning the booklets includes placing the booklets in a tray such that the booklets form a plurality of side-by-side rows of the booklets, said step of applying the first continuous adhesive coating includes applying a plurality of spaced apart, substantially parallel streams of the first adhesive to the booklets to form discrete strips of adhesive, at least one of the adhesive strips being applied to each row of booklets, and said step of inserting the divider bar includes simultaneously inserting the divider bar between selected booklets in each side-by-side row.

49. The method of claim 47 wherein said step of positioning the booklets includes placing the booklets in a tray having a locator slot formed therein and wherein said step of inserting the divider bar includes inserting the divider bar into the locator slot.

50. The method of claim 47 wherein said step of inserting a divider bar includes inserting a divider bar having an outer surface formed of a fluoropolymer resin.

51. An assembly of booklets comprising:

a) a plurality of booklets, each said booklet including:
   (1) a pair of opposed, outer panels joined along a fold, said fold forming a first end edge;
   (2) at least one interior panel disposed between said outer panels; and
   (3) a plurality of second end edges formed along said outer and interior panels opposite said first end edge;
b) a plurality of self-adhesive tab members, each said tab member secured to a respective one of said booklets and overlying said second end edges and secured by the adhesive thereof to each of said outer panels of said respective booklet;
c) a first adhesive coating disposed on and securing said first end edges to one another; and
d) a second adhesive coating disposed on and securing said tab members to one another, wherein said second adhesive coating does not directly contact said booklets.

* * * * *